(12) United States Patent
Kobayashi

(10) Patent No.: US 6,398,546 B1
(45) Date of Patent: Jun. 4, 2002

(54) COMBUSTION IN A POROUS WALL FURNACE

(75) Inventor: Hisashi Kobayashi, Putnam Valley, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/598,159

(22) Filed: Jun. 21, 2000

(51) Int. Cl.[7] ............................................. F27B 14/04
(52) U.S. Cl. ........................... 432/13; 432/23; 432/31; 431/164
(58) Field of Search .................... 432/7, 13, 19, 432/23, 31, 248, 264, 265; 110/260, 342, 344, 336; 431/159, 164–165, 351, 352

(56) References Cited

U.S. PATENT DOCUMENTS

| | | | | |
|---|---|---|---|---|
| 4,948,365 A | * | 8/1990 | Yuen | 432/103 |
| 5,458,672 A | * | 10/1995 | Ding | 75/643 |

* cited by examiner

*Primary Examiner*—Gregory Wilson
(74) *Attorney, Agent, or Firm*—Bernard Lau

(57) ABSTRACT

This invention is directed to a method for carrying out combustion in a furnace having porous walls with a large surface area comprising providing a combustion zone containing an atmosphere of furnace gases. A low velocity oxidant stream is injected through at least one oxidant injection side of the porous walls into the combustion zone and mixing furnace gases with the oxidant stream in a mixing zone within the combustion zone to produce an oxidant mixture. A fuel stream is injected through at least one fuel injection side adjacent to the oxidant injection side in the combustion zone. The oxidant mixture is mixed with the fuel stream to create a fuel-oxidant mixture.

8 Claims, 4 Drawing Sheets

COMBUSTION IN A POROUS WALL FURNACE

TECHNICAL FIELD

This invention relates generally to the field of combustion and more particularly to combustion in a porous wall furnace.

BACKGROUND OF THE INVENTION

In a typical process for heating and/or melting a charge such as glass or metal, certain undesirable features in the process will inevitably occur such as conductive heat loss from the wall of the furnace and corrosion in the furnace wall caused by corrosive gases in the furnace.

Considerable amount of work has been done to address the concerns for overcoming these undesirable features. For example, in order to reduce the loss of heat from the furnace wall during heating and/or melting of the charge, more insulation may be provided. To reduce the corrosion of the refractory walls, certain special refractory materials may be used. Furthermore, certain techniques for premixing the fuel and oxidant before injecting gases into the furnace allow combustion to take place relatively rapidly in spite of low gas injection velocity. However, to the most part, combustion in industrial furnaces in the present state of the art nevertheless involves some aspects of conductive heat loss from the furnace and corrosion caused by corrosive gases, or some other undesirable effects.

For example, in U.S. Pat. No. 5,609,481, a stratified atmosphere combustion is disclosed wherein both fuel and oxidant are introduced very closely into the furnace. In this case, a charge proximal stratum is established between the charge and the combustion gas emanating from one or more burners that are oriented above the charge. The charge-proximal stratum has a different oxidative effect on the charge than does the combustion gases. This method requires both fuel and oxidant to be introduced at very low velocities into a furnace, which tends to cause the fuel and oxidant mixing to be very slow, resulting in poor combustion, like sooty flame.

In another example, U.S. Pat. No. 5,076,779 provides for a segregated zoning combustion. This combustion method separates the oxidant mixing zones and fuel reaction zones in a combustion zone to dilute oxidant and combust fuel under conditions which reduces the NOx formation. This method requires that the oxidant be injected in high velocity and diluted with the furnace gas, thus requiring a high oxygen supply pressure.

Accordingly, it is an object of this invention to provide a furnace system that will enable effective heating and/or melting of a charge so that the heat loss of the system is dramatically reduced, reducing the corrosion of the refractory walls and injecting the oxidant at a low velocity while mixing the oxidant with the fuel or furnace gases at a fast rate.

OBJECTS OF THE INVENTION

It is an object of the invention to provide a method for combustion that reduces the heat loss in the combustion process.

It is another object of this invention to provide a method for combustion that reduces the corrosion in the refractory walls of the furnace.

It is yet another object of this invention to provide a method for combustion that introduces an oxidant at a very low velocity, and which mixes the fuel or furnace gas at a fast rate.

SUMMARY OF THE INVENTION

This invention is directed to a method for carrying out combustion in a furnace having porous walls. A combustion zone containing an atmosphere of furnace gases is provided. A low velocity oxidant stream is injected through at least one oxidant injection side of the porous walls into the combustion zone. A fuel stream is injected through at least one fuel injection side directed toward the oxidant injection side in the combustion zone. In a preferred embodiment, furnace gases are mixed with an oxidant stream or the fuel stream to produce a diluted oxidant or a diluted fuel within the combustion zone. The oxidant and the fuel are mixed, after dilution, and combusted at low flame temperature In an alternative embodiment, a low velocity fuel stream is injected through at least-one-fuel injection side of the porous walls into the combustion zone, and the oxidant stream is injected through at least one oxidant injection side directed toward the fuel injection side of the combustion zone.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

In this invention, oxidant is introduced into a furnace through a porous wall at a low velocity, and fuel is introduced into the furnace from one or more furnace walls. In the preferred embodiments, fuel is introduced into the furnace from the adjacent wall(s), substantially parallel to the porous surface of the furnace for combustion to take place. The fuel is introduced at a distance from the porous wall so that oxidant mixes with a recirculating flow of furnace gases prior to combustion with fuel (i.e., to achieve dilution of oxidant for low NOx emissions). When more rapid combustion is desired, several fuel jets can be directed toward the porous walls so that the fuel jets, with or without dilution through furnace gas entrainment, impinge on the porous wall surfaces.

Figure 1:
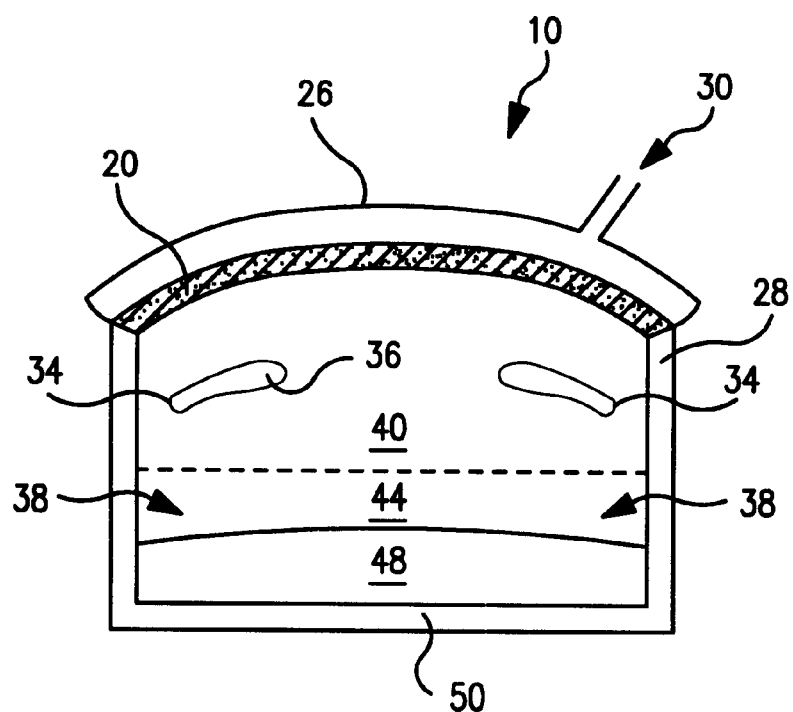
FIG. 1 is a drawing of the porous wall furnace of this invention showing a stratified atmosphere combustion for melting glass therein.
Figure 2:
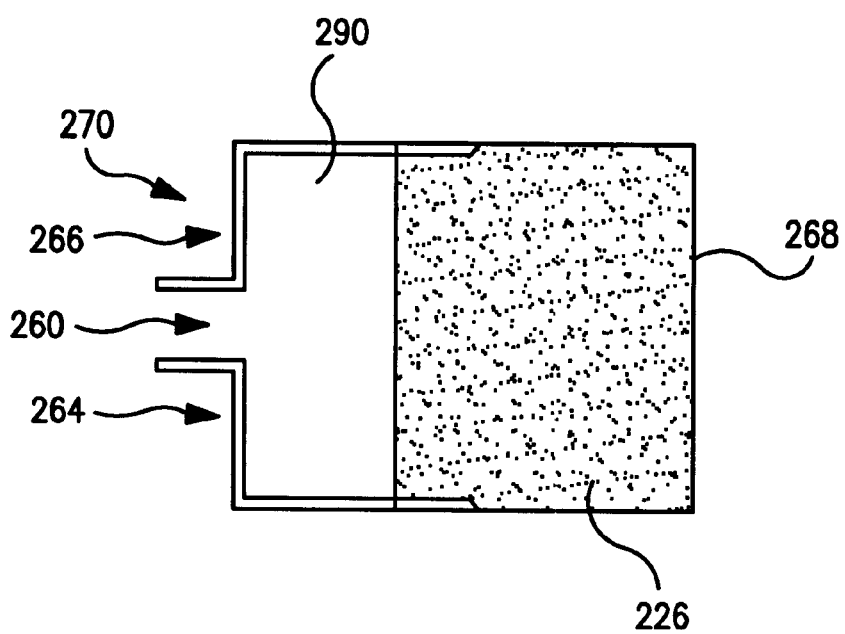
FIG. 2 is a detailed drawing of the porous elements wherein the oxidant or purge gas is to pass through the porous wall element.

FIG. 1 shows an application of the porous wall combustion process for a glass melting furnace 10. Oxidant 30, preferably oxygen, is introduced into the furnace through the furnace porous layer 20 of the furnace roof 26 or crown. The furnace roof 26 may be constructed by joining wall elements. Fuel 34 is injected from furnace side wall 28 for combustion forming flames 36 in the combustion zone 40. The charge or raw material for glass making is introduced into the furnace from an end of the furnace (not shown) and forms a pool of molten glass 48 over the bottom wall 50 of the furnace. In a preferred embodiment, the oxidant stream 30 is provided into the combustion zone 40 from the furnace roof 26. The oxidant stream is then mixed with recirculating furnace gases, causing the concentration of oxygen in the oxidant stream to dilute. A preferred combustion process is through a stratified atmosphere combustion, as shown in FIG. 1, where a second source of oxidant 38 is introduced through a lower portion of sidewall 34 The introduction of the second source of oxidant forms an oxygen rich zone 44 between the combustion zone 40 and the charge 48.

Fuel lances are located in the furnace side walls and the flow rates control-led-to-properly distribute the heat generation within the furnace and to cause furnace gas recirculation. The pore size and thickness of the roof can be adjusted to control the flow of oxidant per unit surface area and the pressure requirement while keeping the conductive heat loss through the wall negligible.

Combustion in the porous wall furnace of this invention involves the provision of oxidants (via an oxidant stream) at a low injection rate. The oxidant is heated by passing through the hot furnace wall and typically introduced at a specific flow rate less than 600 SCFH/ft$^2$, corresponding to an actual oxidant velocity at the porous wall hot surface temperature of less than about 1 ft/sec. Air, oxygen enriched air, or pure oxygen can be used as oxidant. A low oxidant specific flow rate is preferred to reduce the pressure drop across the porous wall and to avoid potential hot spot on the porous wall hot face when using an impinging fuel stream.

In order to eliminate the wall conduction heat loss, the sensible heat of the heated oxidant must be greater than the conductive heat flux through the porous wall without passing the oxidant. Since an important objective is to minimize furnace wall losses, it is preferable to flow the oxidant through most of the available surface areas of the furnace roof and walls (at least 20% of the available roof and wall surface areas of the combustion space). In the preferred embodiment, the entire furnace roof is used and the specific flow rate is less than 150 SCFH/ft$^2$. The oxidant that flows from the porous roof purges the hot face of the roof and helps to prevent corrosive vapors from coming in contact with the roof refractory material.

Comparatively, in the conventional post-mix burner, both the fuel and oxygen streams are injected into the combustion zone of the furnace at sufficiently high velocities to achieve rapid mixing of the fuel and oxidant. Typical velocity of combustion air is 30 to 200 ft per second.

There are many porous refractory materials suitable for use in the present porous wall combustion process. They include refractory walls made of fibers, sintered particles and foams. A non-porous refractory rear body is joined to a front porous refractory element with a gas distribution passage. Oxidant or purge gas 260 is introduced through the rear 266 of the furnace and into a rear chamber 264 prior to uniformly passing through the porous wall element 226. Porous roofs or walls may be constructed by connecting the modular porous wall element 226. The minimum oxidant flow rate to eliminate the wall conduction heat loss can be estimated from the steady state heat loss of the porous material per unit surface area without any gas flow, Q$o$, $$Q_o = cV(T_w - T_o)$$

where c is the specific heat of the oxidant, V is the volume flow rate of the oxidant per unit surface area, and Tw and To are the hot face temperature of the wall and the cold face temperature of the wall, respectively. Typical specific wall heat loss through a glass furnace roof without insulation is in a range between 500 to 1,500 Btu/hr/ft$^2$. For example, 12 inch thick porous silica bricks may be used for glass furnace crown. Assuming that Qo=1000 Stu/hr/ft$^2$ at Tw=2900° F. and To=300° F., and c=8.25 Btu/lb mol/F=0.0217 Btu/F/ft$^3$ at 70° F., V=18 SCFH (ft$^3$ of gas at 70° F. per hr per ft$^2$) which provides a hot face gas velocity of 0.03 ft/sec at 2900° F.

The fuel for mixing with the oxidant for combustion can be introduced with and without a portion of overall oxidant. The fuel injection method depends on the particular applications. For the stratified atmospheric combustion process (see, U.S. Pat. No. 5,609,481), a preferred method is to introduce fuel at low velocity so as to flow fuel near the porous surface and distribute over the entire surface area. One embodiment is shown in FIG. 1. Further embodiments of combustion arrangement using the stratified atmospheric combustion process for glass melting, metal heating and other furnaces are shown in FIGS. 3a and 3b.

Figure 3A:
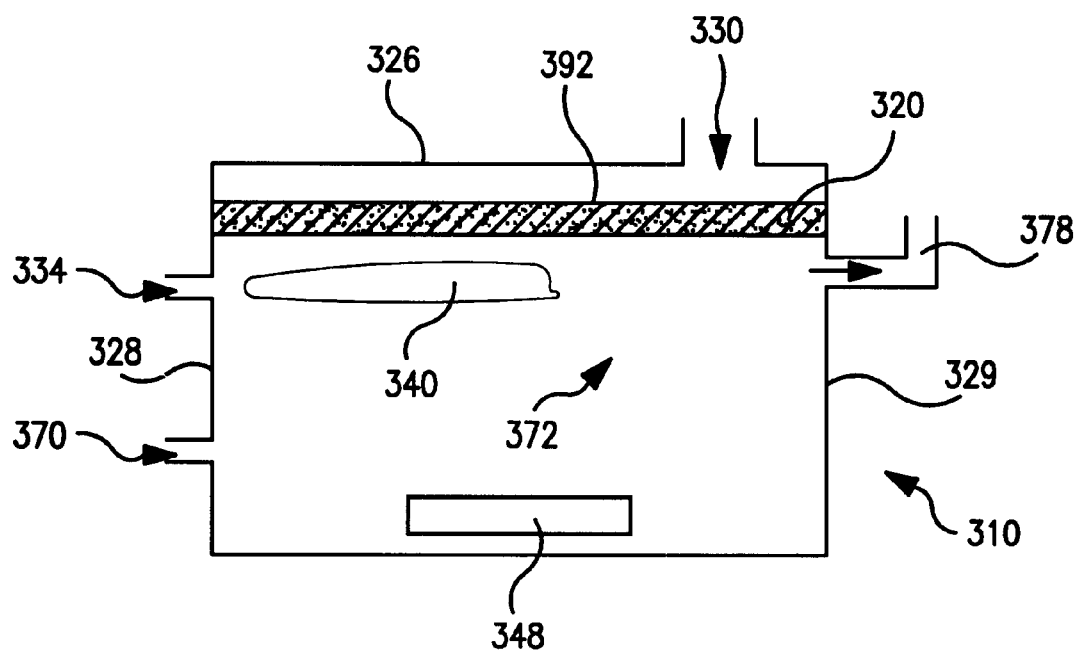
FIGS. 3a and 3b are schematic drawings of the position in the porous wall furnace that show the placement of the oxidant, fuel, flue, atmosphere and a metal charge using the stratified atmosphere combustion method.

In FIG. 3a, the oxidant 330 is introduced from the furnace roof 326 onto a gas cavity 392 before passing through the porous wall layer 320 onto the combustion zone 340. Fuel 334 through multiple fuel nozzles (not shown) is injected toward the porous wall through one sidewall 328 of the furnace 310 into the combustion zone 340 to distribute fuel evenly over most of the porous wall area to form wide flames 336 for combustion. Flue gas 378 is released from the furnace through the upper portion of sidewall 329. Fuel jets may be directed toward, parallel to, or away from the porous wall in order to control the flame shape and coverage. A protective atmosphere in the form of a non-combustible gas is formed in the furnace between the combustion zone 340 and the charge 348. The protective atmospheric gas 370 is injected through the bottom portion of sidewall 328 to form a protective atmosphere zone 372. The protective atmospheric gases may include nitrogen and/or argon.

Figure 3B:
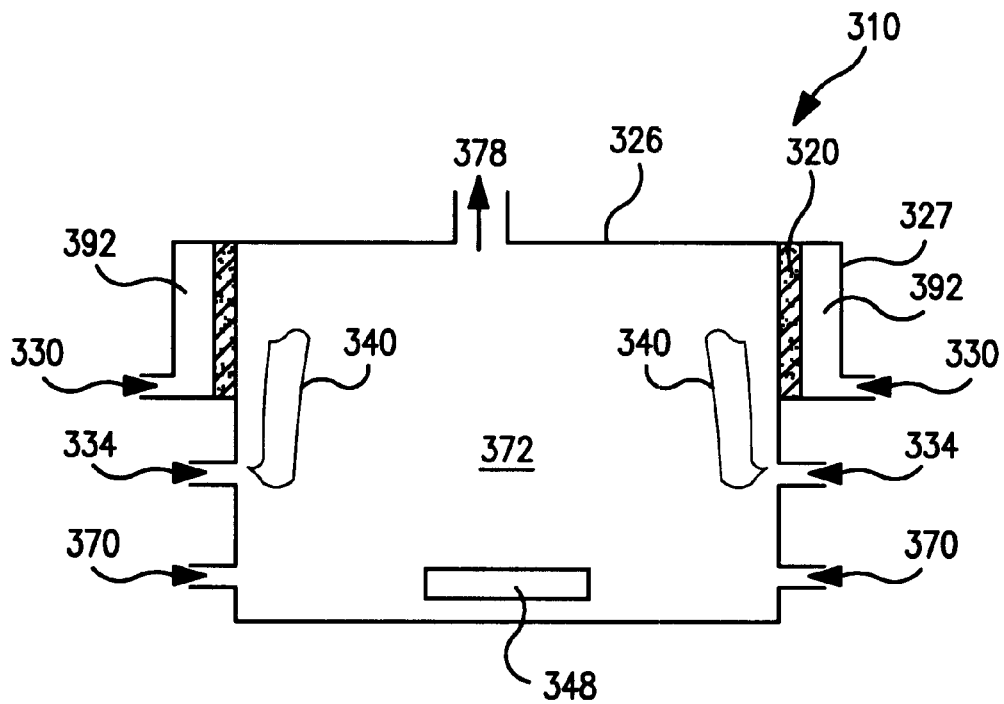

Another preferred embodiment of the present invention using the stratified atmospheric combustion is provided in FIG. 3b. Oxidant 330 is injected through a side wall extension 327, which then passes through the gas cavity 392 before passing through porous wall layer 320 into the furnace 310. Fuel 334 is injected through sidewall 328 into furnace 310 forming a flame 336 in combustion zone 340 therein. Flue gas 378 is released through the furnace roof 326. A protective atmosphere in the form of a noncombustible gas zone 372 is formed about the charge 348 by the injection of protective atmospheric gas 370 through a lower portion of the sidewall 328.

Figure 4A:
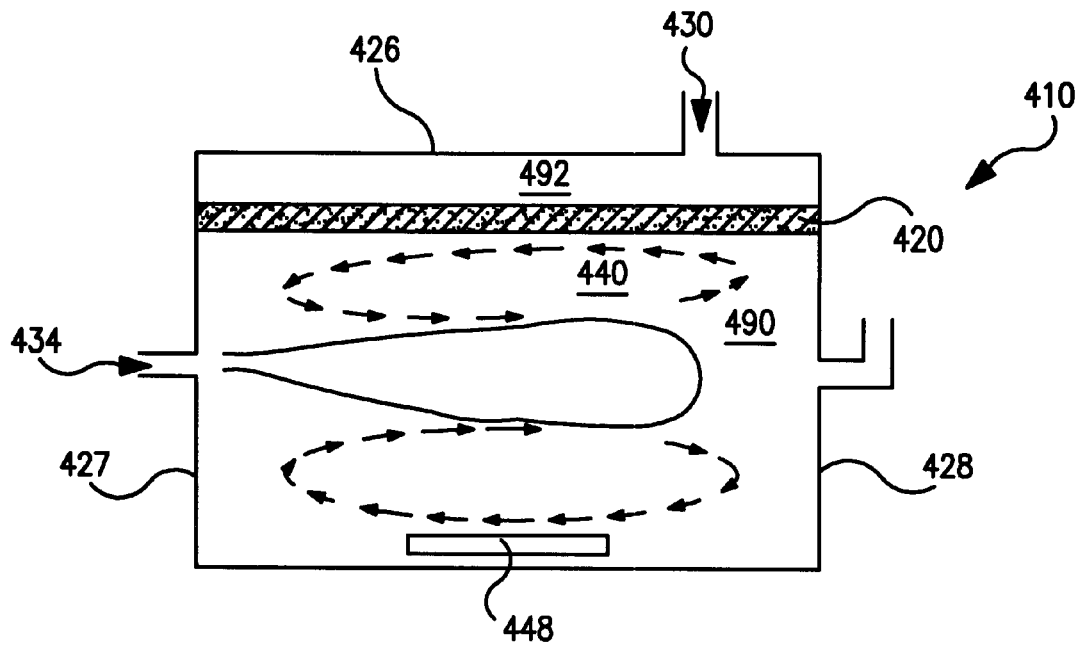
FIGS. 4a and 4b are schematic drawings of the position in the porous wall furnace that show the placement of the oxidant, fuel, flue and a metal charge using the dilute oxidant combustion method.
Figure 4B:
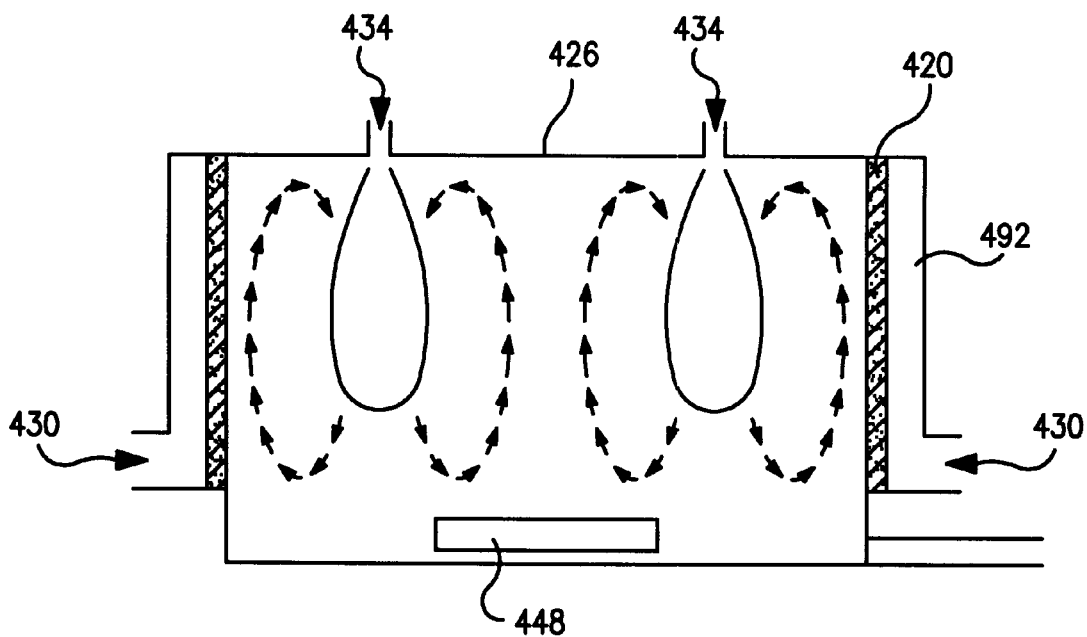

For the dilute oxygen combustion process using the basic concept of segregated zoning combustion (see, U.S. Pat. No. 5,076,779), the fuel may be injected parallel to the porous surface at higher than 100 ft/sec, preferably higher than 120 ft/sec, at some distance away from the porous surface so as to create recirculating flow of furnace gases over the porous surface and to dilute the oxygen concentration of oxidant before reacting with fuel. This type of combustion is represented by FIGS. 4a and 4b.

A dilute oxygen combustion (DOC) scheme that injects oxygen through a porous wall layer is shown in FIG. 4. Fuel 434 is injected through sidewall 428 into the furnace 410. Fuel 434 forms a jet flame 436 (or a fuel reaction zone) and its high injection velocity caused a strong furnace gas recirculation flow pattern 490 for dilution of oxidant prior to combustion in flame 436. Oxidant 430 is injected through a gas cavity 492 and through porous layer 420 into the combustion zone 440.

In an alternative preferred embodiment of the present invention using DOC, fuel is injected from the furnace roof and the oxidant is injected from the sidewall. In FIG. 4b, two separate sources of fuel 434 are injected through the roof 426 of the furnace 410. Separate sources of oxidant 430 are injected for more even and complete combustion. Oxidant 430 is injected through gas cavity 492 for greater even distribution of gas flowing into the porous layer 420 into the combustion zone 440. Fuel 434 forms jet flame (or a fuel reaction zone) and the high fuel injection velocity causes a strong furnace gas recirculation flow pattern 490 for diluting the oxidant before combusting in flame 436. Charge 448 is heated both by furnace radiation and gas convection. Flue gas 478 is released through sidewall 428.

Figure 5:
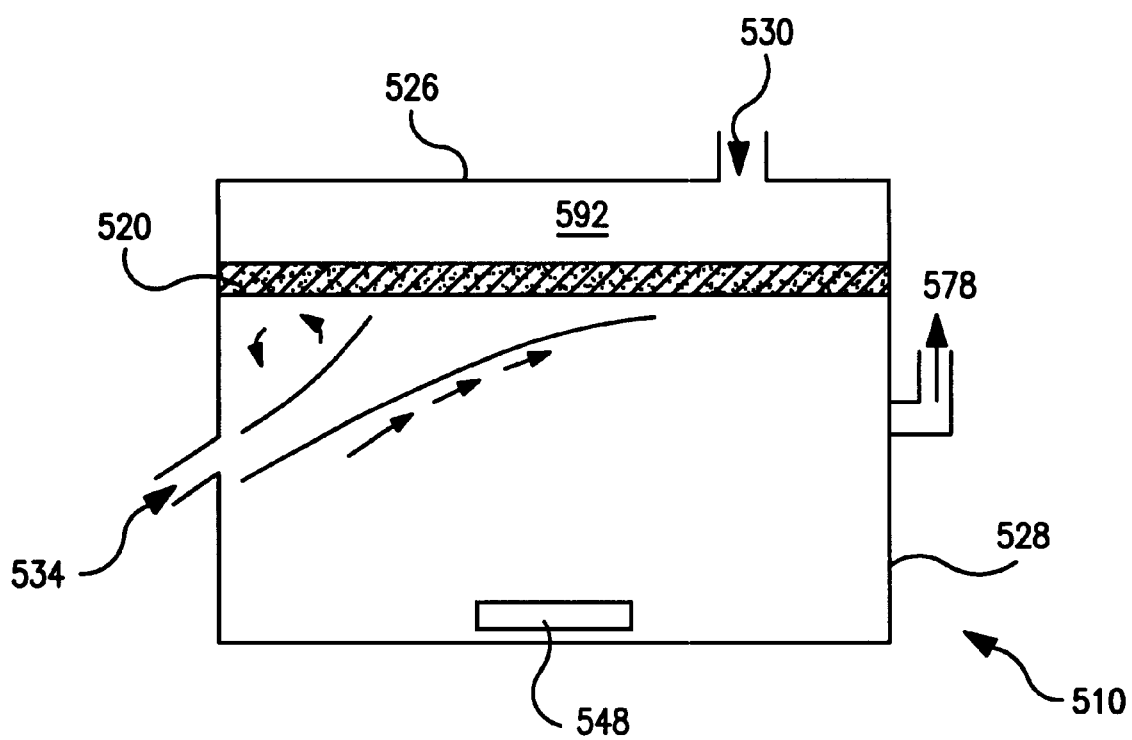
FIG. 5 is a schematic drawing showing the porous wall furnace position where the placement of the oxidant, fuel, flue and a metal charge using a fuel stream impinging on the porous wall with oxidant flow.

As mentioned previously, jets of fuel streams can be injected toward the porous wall with oxidant emanating from the surface in some applications. FIG. 5 is a schematic drawing of the position in the porous wall furnace that shows the placement of the oxidant, fuel, flue and a metal charge using a fuel stream impinging on the porous wall with oxidant flow. Fuel 534 is injected through sidewall 528 into the furnace 510. Fuel 534 forms a jet 536 that impinges on the surface of the porous wall 520. Multiple fuel jets may be placed to distribute fuel evenly over the porous wall. Oxidant 430 is injected through a gas cavity 592. Flue gas 578 is released through sidewall 528.

Rapid combustion may take place at or near the porous wall in this arrangement. A concern on this arrangement is potential overheating of the porous wall, especially near the fuel jet impingement area. In this case, careful placement of the fuel injection ports as well as a proper selection of the oxygen flux through the porous wall are required. If the impinging fuel jet contains a high combustible gas concentration near the impingement point, the net oxygen flux through the porous wall should be limited to less than 200 SCFH, preferably less than 100 SCFH. The net oxygen flux is calculated by multiplying the oxidant flux through the porous wall by the fractional oxygen volume concentration in the oxidant. By limiting the oxygen flux, the maximum heat release at the surface of the porous wall is controlled to about 100,000 Btu/hr/ft2 at an oxygen flux of 100 SCFH. Because of the cooling of the porous surface by radiant heat transfer, excessive heating can be avoided and low NOx emissions are achieved without dilution with furnace gases. If the impinging fuel jet contains little combustible gases, then higher oxygen flux is beneficial due to the cooling effect of oxidant.

An important variation of the present porous wall combustion process is the use of a ceramic membrane material in place of a porous material so as to enable the oxygen or enriched oxygen to pass into the furnace while feeding air on the other side of the membrane material. U.S. Pat. 5,888,272 describes processes using ceramic membranes in a combustor. In order to limit the maximum temperature of the membrane material, a membrane wall furnace chamber may be added to the main furnace with flue gas recirculation between the main furnace and the membrane wall furnace chamber. For example, an integrated membrane air separation may be used in conjunction with the dilute oxygen combustion process. This process utilizes a ceramic membrane air separation chamber on one side of the furnace to supply oxygen or enriched oxygen into the furnace.

In an alternative embodiment, fuel is used as the purge gas in place of oxidant. In this way, the fuel stream is introduced into the porous wall at a low velocity, and the oxidant-is introduced into the furnace from the adjacent wall(s), toward the porous surface of the furnace for combustion.

In typical combustion of natural gas with air, the volume flow rate of air is about ten times of that of fuel. Thus, fuel provides a relatively small heat capacity to counter the conductive heat loss. For oxy-fuel combustion, the volume ratio of oxygen to natural gas is about 2 to 1, and the use of fuel as a purge gas may be important for some applications. For example, it is advantageous to use fuels with relatively low heating values, such as blast furnace gas and coke oven gas, as purge gas. For combustion of a typical blast furnace gas, about 2 volume of fuel is required to combust one volume of combustion air.

The use of both fuel and oxidant as separate purge gases are also possible. However, it is difficult to achieve good mixing for combustion. Premixing of fuel and oxidant and combusting at the surface of the porous refractory material is known. However, the velocity of the premixed gas must be high enough to prevent the flash back.

Premature ignition within the porous material would result in overheating or melting of the porous material. This is particularly a problem when oxygen enrich air or oxygen is used. As a result, it is undesirable to premix the fuel and oxidant unless the velocity of the premix gas is introduced at a sufficiently high velocity to prevent flash back.

Other potential problems of using a hydrocarbon fuel as a purge gas is the formation of soot and reaction with porous refractory materials. Silicon carbide and other materials are available for such applications. In order to prevent soot formation, a mixture of fuel and recycled flue gas may be used, especially for oxy-fuel combustion applications. In this case endothermic reaction of methane with carbon dioxide and water may provide a special benefit of recovering the heat as chemical energy.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A method for carrying out combustion in a furnace having porous walls comprising:
   a) providing a combustion zone containing an atmosphere of furnace gases;
   b) injecting a low velocity oxidant stream through at least one oxidant injection side of the porous walls into the combustion zone at a specific flow rate less than 600 SCFH/ft$^2$;
   c) injecting a fuel stream through at least one fuel injection side directed toward the oxidant injection side in the combustion zone at a distance from the oxidant stream so that the oxidant stream mixes with recirculating flow of furnace gases prior to combustion; and
   d) mixing the low velocity oxidant and fuel stream in said combustion zone to create a flame with reduced flame temperature.

2. The method of claim 1 comprising passing the oxidant stream through the roof of the furnace and the fuel stream through at least one side wall of the furnace.

3. The method of claim 1 further comprising mixing said furnace gas with the oxidant stream in a mixing zone to produce a diluted oxidant-furnace gas mixture prior to mixing the fuel to create a flame.

4. The method of claim 1 further comprising mixing said furnace gas with the fuel stream to produce a diluted fuel-furnace mixture prior to mixing with the oxidant to create a flame.

5. A method for carrying out combustion in a furnace having porous walls comprising:

a) providing a combustion zone containing an atmosphere of furnace gases;
b) injecting a low velocity fuel stream through at least one fuel injection side of the porous walls into the combustion zone at a specific flow rate less than 600 SCFH/ft$^2$;
c) injecting an oxidant stream through at least one oxidant injection side directed toward the fuel injection side in the combustion zone at a distance from the fuel stream so that the fuel stream mixes with recirculating flow of furnace gases prior to combustion; and
d) mixing the diluted fuel and oxidant mixtures to create a flame with reduced flame temperature.

6. The method of claim 5 comprising passing the fuel stream through the roof of the furnace and the oxidant stream through at least one side wall of the furnace.

7. The method of claim 5 further comprising mixing said furnace gas with the oxidant stream in a mixing zone to produce a diluted oxidant-furnace gas mixture prior to mixing the fuel to create a flame.

8. The method of claim 5 further comprising mixing said furnace gas with the fuel stream to produce a diluted fuel-furnace mixture prior to mixing with the oxidant to create a flame.

* * * * *